United States Patent [19]

Pollert

[11] Patent Number: 4,778,490
[45] Date of Patent: Oct. 18, 1988

[54] PROCESS FOR REMOVAL OF VOLATILE MATTER FROM COKE-OVEN PLANT WATERS

[75] Inventor: Georg Pollert, Essen, Fed. Rep. of Germany

[73] Assignee: Bergwerksverband GmbH, Essen, Fed. Rep. of Germany

[21] Appl. No.: 57,907
[22] PCT Filed: Sep. 17, 1986
[86] PCT No.: PCT/EP86/00535
  § 371 Date: Jun. 15, 1987
  § 102(e) Date: Jun. 15, 1987
[87] PCT Pub. No.: WO87/01687
  PCT Pub. Date: Mar. 26, 1987

[30] Foreign Application Priority Data

Sep. 21, 1985 [DE] Fed. Rep. of Germany ....... 3533799

[51] Int. Cl.⁴ .............................................. B01D 53/14
[52] U.S. Cl. ............................................ 55/53; 55/70; 55/73; 423/237
[58] Field of Search ........ 55/53, 54, 70, 73; 210/758, 210/761; 423/237

[56] References Cited

U.S. PATENT DOCUMENTS

| | | | |
|---|---|---|---|
| 3,540,189 | 11/1970 | Siewers et al. | 55/70 X |
| 3,754,376 | 8/1973 | Kent | 55/54 X |
| 4,250,160 | 2/1981 | Eakman | 423/237 X |
| 4,486,299 | 12/1984 | Kettinger | 208/356 |

FOREIGN PATENT DOCUMENTS

| | | |
|---|---|---|
| 1444972 | 2/1969 | Fed. Rep. of Germany . |
| 2330888 | 4/1975 | Fed. Rep. of Germany . |
| 2558754 | 10/1977 | Fed. Rep. of Germany . |
| 2946433 | 5/1981 | Fed. Rep. of Germany . |
| 3310712 | 9/1984 | Fed. Rep. of Germany . |

OTHER PUBLICATIONS

Optimum Design of Sour Water Strippers, Melin et al., Chemical Eng. process, vol. 71), Jun. 1975, pp. 78–83.
Konzeption einer modernen Nebengewinnung in einer Huttenkokerei, Vom. E. Th. Herpers, Haus der Technik Vortragsveroffentlichungen 470, Kokereitechnik, pp. 41–50.
Flachblatt fur Gastechnik und Gaswirtschaft sowie fur Wasser und Abwasser, 105 Jahrgang, Heft 9, Feb. 28, 1964, G. Choulat, Verfahren fur die Aufarbeitung des in Kokereien. und ... pp. 225-232.

Primary Examiner—Charles Hart
Attorney, Agent, or Firm—Herbert Dubno

[57] ABSTRACT

In a process for removal of volatile matter such as ammonia, hydrogen-sulphide, and prussic acid from coke-oven plant water by means of gas in a stripper, the tail gas of an ammonia destruction unit is used as stripping gas. Tail gas from a Claus plant can be proportioned to the tail gas of the ammonia destruction unit.

7 Claims, 2 Drawing Sheets

PROCESS FOR REMOVAL OF VOLATILE MATTER FROM COKE-OVEN PLANT WATERS

CROSS REFERENCE TO RELATED APPLICATIONS

This application is a National Phase application corresponding to PCT/EP86/00535 filed Sept. 17, 1986 and based, in turn, upon a German National application P35 33 799.0 of Sept. 20, 1985 under the International Convention.

FIELD OF THE INVENTION

The invention relates to a process for removal of volatile matter such as ammonia, hydrogen sulphide, and prussic acid from coke-oven plant waters by means of gas in a stripper.

BACKGROUND OF THE INVENTION

During the coking of coal, waters are produced which contain not only organic and non-volatile anorganic matter, but also volatile inorganic matter such as ammonia, hydrogen sulphide and prussic acid. These volatile inorganic compounds need to be removed to the maximum possible extent before these waters are recycled to the process for washing and scrubbing purposes, or—in the majority of cases after further treatment for removal or partial removal of other noxious matter—are discharged into the sewage. The removal of volatile inorganic matter contained in such waters is normally carried out in the coke-oven plant in stripper columns by means of steam. Aside from steam, other gases can be used as stripping gases.

German patent document DE-OS No. 14 44 972 contains a proposal to subject water from the gas collecting main of a coke-oven plant to a stripping process with an inert gas such as air, flue gas, or a blend of both for removing ammonia and phenols.

Because of the unsatisfactory proceeds from ammonia sales more and more ammonia destruction units are operated in coke-oven plants (E. TH. Herpers; Haus der Technik, lecture, Vortragsveröffentlichung 470, p. 41 to 50). These cracking units are run on vapors from stripping columns which contain mainly ammonia, carbon dioxide, and steam; generally also present prussic acid and hydrogen sulphide. While prussic acid is cracked completely, and ammonia as well, except for a small remainder, the hydrogen sulphide remains unaffected. Accordingly, the cracked gases need to be cleaned. This is normally done by cycling cracked gases after waste-heat recovery and cooling to the raw-gas cleaning process. After waste-heat recovery (steam production), the cracking gas still contains energy which, however, is qualified as of low value, and therefore is discharged (Gas- und Wasserfach, Heft 9 (1964), p. 225 to 232).

OBJECT OF THE INVENTION

The object of the invention is to provide a process which can make use of the energy contained in the tail gases of ammonia destruction plants, and which normally is discharged as waste-heat.

SUMMARY OF THE INVENTION

This object is attained in a process for removing volatile matter such as ammonia, hydrogen sulphide, and prussic acid from coke-oven plant waters by means of a stripping gas in a stripper. According to the invention, the tail gas of an ammonia destruction unit is used as the stripping gas.

The tail gas from a Claus plant can be proportioned to the tail gas of ammonia destruction unit and the tail gas from the ammonia destruction unit can be fed through a Claus plant prior to being fed to the stripper.

Advantageously, the operation temperature of the stripper is higher than 70° C., preferably in the range between 70° C. and 90° C., while the gas/liquid ratio is held in the range between 50 and 500 m$^3$ (STP, dry) per 1 m$^3$, preferably between 80 and 250 m$^3$ (STP, dry) per 1 m$^3$. Steam can be proportioned to the stripping gas.

The process covered by this invention can be integrated cost-effectively into operations of coke-oven plants operating with an ammonia destruction unit. It is merely required to integrate a stripper into the tail gas main of the ammonia destruction unit. An additional cleaning step for the gas leaving the stripper is not required since the gas is recycled to the raw-gas cleaning process anyhow.

Surprisingly, tests have shown that stripping by means of the tail gas, even though the latter contains high concentrations of hydrogen sulphide (approx. 5–20 g/m$^3$, STP, dry), yields results equivalent to those of a conventional destruction unit run on steam.

In a further advantageous design of the invention, the cracking gas from an ammonia cracking unit can be blended with the tail gas from a Claus plant, and then used for stripping. In this way, also the energy contained in the tail gases of the Claus plant can be made use of. Since that gas also contains H$_2$S, the application of the process covered by this invention makes an additional H$_2$S-removal step superfluous.

Also the tail gas of an ammonia cracking unit cycled through a Claus plant prior to being cycled to the stripper, can be used as stripping gas.

During operation of stripping by means of these gases as per this invention, the energy otherwise discharged as waste-heat is made use of, and, accordingly, the corresponding energy in the form of steam is saved. At the same time there is no need for cooling water otherwise necessary for condensing the steam used in the plant, and waste water in form of condensed steam is eliminated as well.

The operation temperature of the stripping is higher than 70° C., preferably in the range between 70° C. and 90° C., and the gas/liquid ratio is approximately 50 to 500 m$^3$ (STP, dry) per 1 m$^3$, preferably of 80 to 250 m$^3$ (STP, dry) per 1 m$^3$.

For achieving higher temperatures in the stripper, the steam production from cracking gas can be reduced. However, steam can be directly to the cracking gas for this purpose.

SPECIFIC DESCRIPTION

Figure 1:
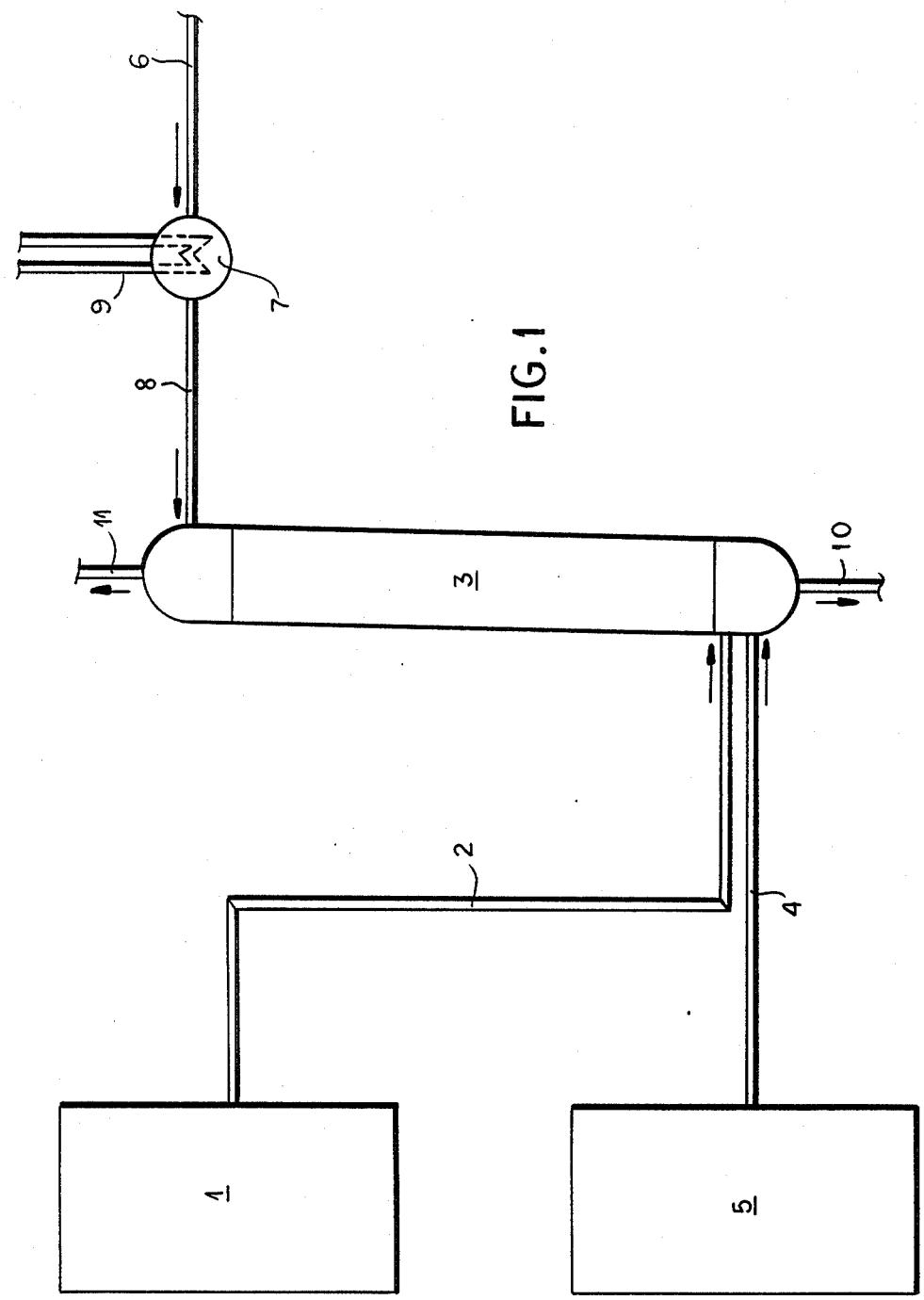
FIG. 1 is a flow diagram of a process as per this invention using the tail gas from an ammonia cracking unit and from a Claus unit.

From FIG. 1 it may be seen that the tail gas from an ammonia cracking plant 1 is cycled via a pipeline 2 to a stripper 3. In addition, gas can be cycled to the stripper 3 via a pipeline 4 from a Claus plant 5. Via a pipeline 6, a heat exchanger 7, and a pipeline 8, the stripper 3 receives water, laden with volatile matter. Via the pipeline 9 the volatile-matter-laden water is heated in a heat exchanger 7 by steam. The bottom (sump) discharge from the stripper unit is evacuated via a pipeline 10, and the gas, laden with volatile matter leaves the stripper 3 via a pipeline 11.

Figure 2:
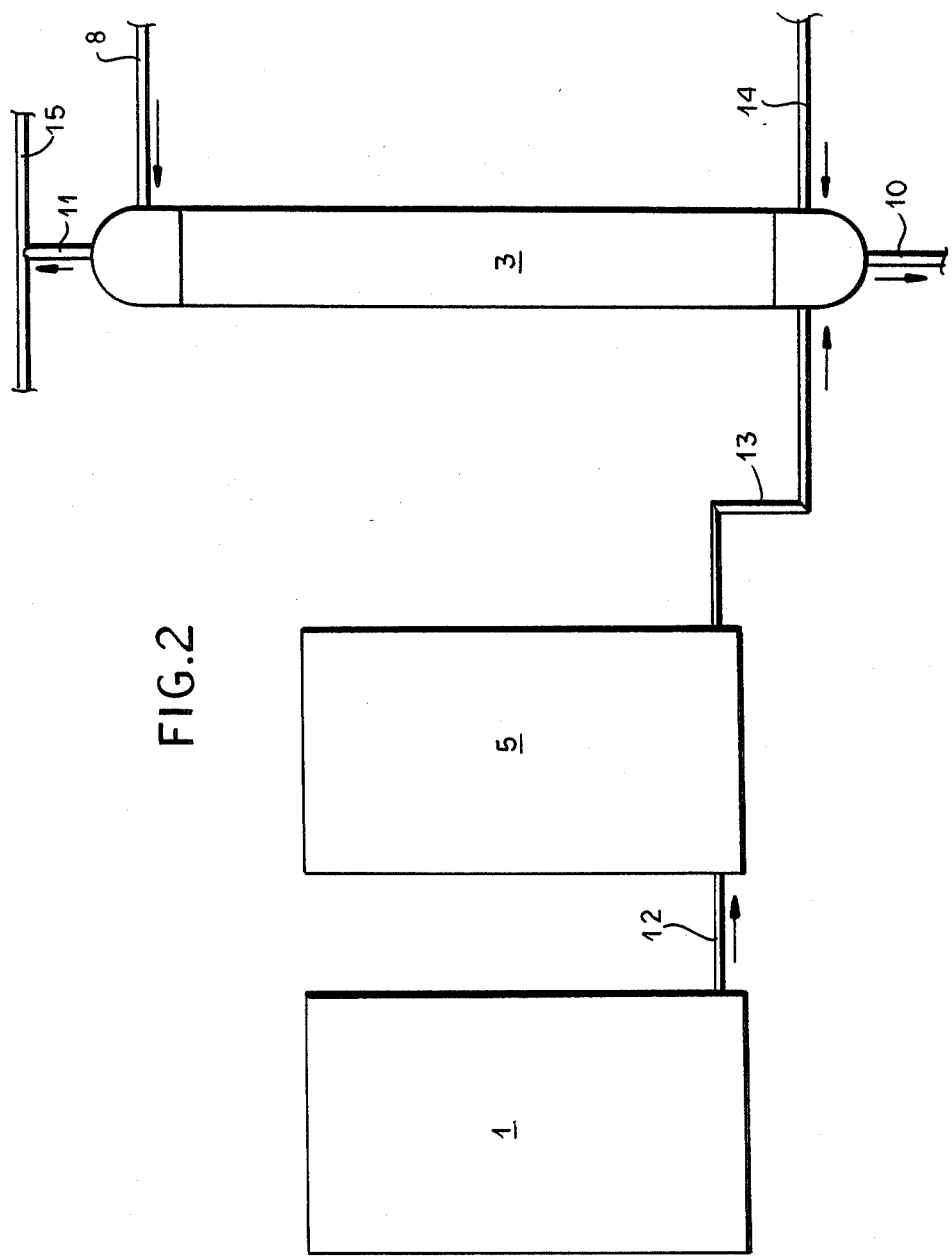
FIG. 2 is a flow diagram of the process showing the tail gas from an ammonia cracking unit being cycled through a Claus plant prior to being cycled to the stripper.

FIG. 2 shows that the tail gas from the ammonia cracking unit 1 is first cycled via a pipeline 12 to the Claus plant 5. Via a pipeline 13 the tail gas is cycled to the stripper 3. The stripper 3 is supplied with volatile-matter-laden water via the pipeline 8. The volatile-matter-laden gas then is cycled via the pipeline 11 to the raw-gas main 15 of the coke-oven plant. The stripper can be supplied with steam via the pipeline 14.

SPECIFIC EXAMPLES

Example 1

In a plant as per FIG. 1 4,400 $m^3$ (STP, dry)/h of cracking gas with a residual ammonia concentration of 0.1 $g/m^3$ (STP, dry), a hydrogen sulphide concentration of 12 $g/m^3$ (STP, dry) and a water content of 640 $g/m^3$ (STP, dry) are fed at a temperature of 300° C. from the steam generator of the ammonia destruction unit 1 via the pipeline 2 to the bottom of the 20-tray stripper 3. Via the pipeline 4, 800 $m^3$ (STP, dry)/h of tail gas from the Claus plant 5, with a hydrogen sulphide concentration of 25 $g/m^3$ (STP, dry), a sulphur dioxide concentration of 23.5 $g/m^3$ (STP, dry) and a water content of 300 $g/m^3$ (STP, dry) are fed at a temperature of 140° C. to the bottom of the stripper. Here, the gases are cooled by the liquid running down, and saturated with water vapor, so that 1,125 kg water per hour are evaporated and, for the stripping process, 5,200 $m^3$ (STP, dry) of gas with a steam content of 804 $g/m^3$ (STP, dry) are available at a temperature of 81.5° C. Via the pipeline 6, the heat exchanger 7, and the pipeline 8, 37 $m^3$/h of water from the gas collecting main circuit of the coke-oven plant are cycled to the top of the stripper 3. In the heat exchanger 7 this water is heated indirectly by the steam coming from pipeline 9, from 70° C. to 81.5° C. The water contains 3 g of free ammonia, 0.5 g of hydrogen sulphide, and 0.05 g of prussic acid per liter. In the stripper, the water is freed most extensively from the contained gases. The liquid leaving the stripper via the pipeline 10 has a residual content of less than 20 mg of prussic acid per liter and 4 mg of hydrogen sulphide per liter. The free-ammonia content is equal to zero, because the ammonia not removed together with the gas is bound by the sulphur dioxide from the Claus plant in form of ammonium sulfite. The volatile-matter-laden gas leaves the stripper by the pipeline 11 at 80° C.

Example 2

In a plant as per FIG. 2, 4,000 $m^3$ (STP, dry)/h of gas are withdrawn via the pipeline 13 from the Claus plant 5 which is supplied via the pipeline 12 from the ammonia destruction unit 1. The gas has a temperature of 120° C. and a residual content of 15 g of hydrogen sulphide, 20 mg of ammonia, and traces of sulphur dioxide as well as a water content of 400 $g/m^3$ (STP, dry). The gas is cycled to the bottom of the stripper 3 which is a column with 25 trays. 560 kg of steam per hour are proportioned to the gas via the pipeline 14, so that the gas is brought to a saturation temperature of approx. 77° C. in the stripper 3. Via the pipeline 8, 18 $m^3$/h of water from the coke oven plant's gas collecting main circuit are cycled at a temperature of 77° C. to the top of the stripper 3. The water contains 2.5 g of free ammonia, 0.3 g of hydrogen sulphide, and 0.04 g of prussic acid per liter, and is freed in the stripper almost completely of its anorganic components. The liquid from the bottom of the stripper is fed via the pipeline 10 from the system at 77° C. and, after cooling, can be used e.g. directly for ammonia water scrubbing of the coke-oven gas. The water still contains 70 mg of ammonia, less than 20 mg of prussic acid, and 5 mg of hydrogen sulphide per liter. The volatile-matter-laden gas leaves the stripper 3 via the pipeline 11 at 75° C., and is fed to the raw-gas main 15 for being cooled and cleaned together with the raw coke-oven gas.

We claim:

1. A process for removing volatile components selected from the group which consists of ammonia, hydrogen sulfide and prussic acid from a coke-oven-plant water containing same, comprising the steps of:
   (a) feeding a coke-oven-plant water containing volatile components selected from the group which consists of ammonia, hydrogen sulfide and prussic acid to a stripper;
   (b) generating a stripping gas in the form of an exhaust gas from an ammonia cracker and feeding said stripping gas to said stripper;
   (c) stripping said coke-oven-plant water containing said volatile components selected from the group which consists of ammonia, hydrogen sulfide and prussic acid in said stripper with said stripping gas in the form of said exhaust gas from said ammonia cracker; and
   (d) maintaining the stripping temperature in step (c) for stripping said coke-oven-plant water containing said volatile components selected from the group which consists of ammonia, hydrogen sulfide and prussic acid with said stripping gas in the form of said exhaust gas from said ammonia cracker, above 70° C. during the stripping.

2. The process for removing volatile components selected from the group which consists of ammonia, hydrogen sulfide and prussic acid from a coke-oven-plant water containing same defined in claim 1 wherein said temperature in step (d) is maintained between 70° C. and 90° C.

3. The process for removing volatile components selected from the group which consists of ammonia, hydrogen sulfide and prussic acid from a coke-oven-plant water containing same defined in claim 1 wherein said exhaust gas from said ammonia cracker is admixed with steam to form said stripping gas.

4. The process for removing volatile components selected from the group which consists of ammonia, hydrogen sulfide and prussic acid from a coke-oven-plant water containing same defined in claim 1 wherein said exhaust gas from said ammonia cracker is admixed with a Claus plant tail gas to form said stripping gas.

5. The process for removing volatile components selected from the group which consists of ammonia, hydrogen sulfide and prussic acid from a coke-oven-plant water containing same defined in claim 1 wherein said exhaust gas from said ammonia cracker is fed through a Claus plant before being fed to said stripper.

6. The process for removing volatile components selected from th group which consists of ammonia, hydrogen sulfide and prussic acid from a coke-ovenplant water containing same defined in claim 1 wherein the stripping is carried out in step (c) with a stripping-gas/water ratio of 50 to 500 m³(dry STP)/m³.

7. The process for removing volatile components selected from the group which consists of ammonia, hydrogen sulfide and prussic acid from a coke-oven-plant water containing same defined in claim 1 wherein said stripping-gas/water ratio is 80 to 250 m³(dry STP)/m³.

* * * * *